(12) United States Patent
Su et al.

(10) Patent No.: US 10,277,589 B2
(45) Date of Patent: Apr. 30, 2019

(54) VOICEPRINT VERIFICATION METHOD, APPARATUS, STORAGE MEDIUM AND DEVICE

(71) Applicant: Baidu Online Network Technology (Beijing) Co., Ltd., Beijing (CN)

(72) Inventors: Dan Su, Beijing (CN); Yong Guan, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 15/119,707

(22) PCT Filed: Nov. 3, 2015

(86) PCT No.: PCT/CN2015/093621
§ 371 (c)(1),
(2) Date: Aug. 17, 2016

(87) PCT Pub. No.: WO2016/070774
PCT Pub. Date: May 12, 2016

(65) Prior Publication Data
US 2017/0244701 A1    Aug. 24, 2017

(30) Foreign Application Priority Data
Nov. 7, 2014  (CN) .......................... 2014 1 0643064

(51) Int. Cl.
*G06F 3/16*      (2006.01)
*G06F 21/36*     (2013.01)
(Continued)

(52) U.S. Cl.
CPC ...... *H04L 63/0861* (2013.01); *G06F 3/04883* (2013.01); *G06F 3/04886* (2013.01);
(Continued)

(58) Field of Classification Search
CPC ............. H04L 63/0861; G06F 3/04883; G06F 3/04886; G06F 21/36
See application file for complete search history.

(56) References Cited

U.S. PATENT DOCUMENTS

| | | | |
|---|---|---|---|
| 6,681,205 B1 * | 1/2004 | San Martin ............. | G10L 17/24 704/243 |
| 6,973,575 B2 * | 12/2005 | Arnold .................... | G06F 21/32 713/168 |

(Continued)

FOREIGN PATENT DOCUMENTS

| CN | 101183941 A | 5/2008 |
|---|---|---|
| CN | 101374149 A | 2/2009 |

(Continued)

OTHER PUBLICATIONS

International Search Report for Application No. PCT/CN2015/093621 dated Feb. 2, 2016, in 4 pages.

(Continued)

*Primary Examiner* — Sharon S Lynch
(74) *Attorney, Agent, or Firm* — Knobbe Martens Olson & Bear LLP

(57) ABSTRACT

The present invention discloses a voiceprint verification method, apparatus, storage medium and device. The method includes the following steps: generating and displaying, by a client terminal, random identifiers of various keyboard elements having fixed identifiers, so as to enable a user to set a password by inputting a voice signal of the random identifier of at least one of the keyboard elements (110); and receiving, by the client terminal, a first voice signal input when the user sets the password, and transmitting the first voice signal to a server (120); receiving, by a server, a first voice signal which is input when a user sets a password and forwarded by a client terminal; extracting, by the server, at least one random identifier from the first voice signal, (Continued)

wherein each of the random identifiers respectively corresponds to a keyboard element having a fixed identifier; and determining, by the server, the respective fixed identifiers of the keyboard elements corresponding to the various extracted random identifiers, and determining and storing the password set by the user according to the determined fixed identifiers. By means of the above mentioned method, the problem in the prior art that a fixed password is visible is avoided, thereby improving the security.

6 Claims, 6 Drawing Sheets

(51) Int. Cl.
  *H04L 29/06* (2006.01)
  *G06F 3/0488* (2013.01)
  *G06F 21/32* (2013.01)
(52) U.S. Cl.
  CPC .............. *G06F 3/167* (2013.01); *G06F 21/36* (2013.01); *H04L 63/0838* (2013.01)

(56) References Cited

U.S. PATENT DOCUMENTS

| | | | | |
|---|---|---|---|---|
| 8,117,652 B1* | 2/2012 | Lu | ............................ | G06F 21/31 713/182 |
| 8,788,349 B2* | 7/2014 | Albisu | .................... | G06Q 20/20 705/16 |
| 9,172,697 B1* | 10/2015 | Holtz | ..................... | H04L 63/083 |
| 9,336,779 B1* | 5/2016 | Patel | ........................ | G06F 21/36 |
| 9,876,782 B2* | 1/2018 | Holtz | .................... | H04L 63/083 |
| 9,898,723 B2* | 2/2018 | Rutherford | ............. | G06Q 20/20 |
| 2002/0152070 A1* | 10/2002 | Oda | .................... | G07C 9/00158 704/246 |
| 2003/0163739 A1 | 8/2003 | Armington et al. | | |
| 2005/0089172 A1* | 4/2005 | Fujimoto | ................. | G06F 21/32 380/275 |
| 2007/0130618 A1* | 6/2007 | Chen | ........................ | G06F 21/36 726/8 |
| 2009/0254757 A1* | 10/2009 | Toyama | .................. | G10L 17/10 713/186 |
| 2010/0017209 A1* | 1/2010 | Yu | ............................ | G06F 21/32 704/246 |
| 2013/0036461 A1 | 2/2013 | Lowry | | |
| 2014/0020074 A1* | 1/2014 | White | ...................... | G06F 21/32 726/7 |
| 2014/0172430 A1* | 6/2014 | Rutherford | ............ | G06Q 20/20 704/273 |
| 2015/0067829 A1* | 3/2015 | Liu | ...................... | G06F 3/04817 726/19 |

FOREIGN PATENT DOCUMENTS

| | | |
|---|---|---|
| CN | 102413100 A | 4/2012 |
| CN | 202261808 U | 5/2012 |
| CN | 102543084 A | 7/2012 |
| CN | 104468522 A | 3/2015 |
| JP | 2002-342288 | 11/2002 |
| KR | 20110012270 A | 2/2011 |
| WO | 2013118302 A1 | 8/2013 |

OTHER PUBLICATIONS

Search Report received in European Application No. EP 15857877 dated Jul. 18, 2018.

* cited by examiner

Generating and displaying, by a client terminal, random identifiers of various keyboard elements having fixed identifiers, so as to enable a user to input a password by inputting a voice signal of the random identifier of at least one of the keyboard elements during login — 310

Receiving, by the client terminal, a third voice signal input by the user during password verification, and transmitting the third voice signal to a server — 320

Fig. 6

Receiving, by a server, a third voice signal which is input by a user during password verification and forwarded by a client terminal — 410

Extracting, by the server, at least one random identifier from the third voice signal, each of the random identifiers respectively corresponding to a keyboard element having a fixed identifier — 420

Determining, by the server, the respective fixed identifiers of the keyboard elements corresponding to the various extracted random identifiers, and determining a password input by the user according to the determined fixed identifiers — 430

Comparing, by the server, the password input by the user with the password which is set by the user and pre-stored in a registration phase, obtaining a user identity authentication result according to a password comparison result, and returning the user identity authentication result to the client terminal — 440

Fig. 7

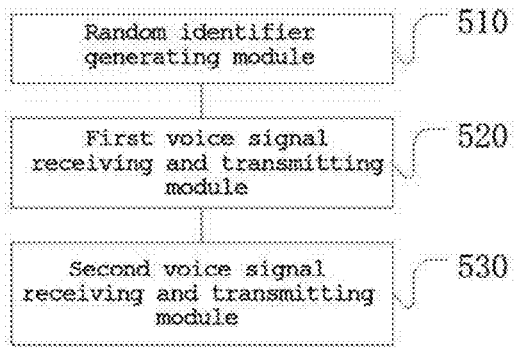

Fig. 8

VOICEPRINT VERIFICATION METHOD, APPARATUS, STORAGE MEDIUM AND DEVICE

CROSS REFERENCE TO RELATED APPLICATIONS

The present patent application claims the priority of Chinese patent application No. 201410643064.3 filed by Baidu Online Network Technology (Beijing) Co., Ltd., on Nov. 7, 2014, and entitled "VOICEPRINT VERIFICATION METHOD AND APPARATUS," the entire contents of which are incorporated herein by reference.

TECHNICAL FIELD

Embodiments of the present invention relate to a voiceprint identification technology, and in particular, to a voiceprint verification method, apparatus, storage medium and device.

BACKGROUND

The traditional login mode based on a password or a gesture is mediocre in terms of safety. Once the password or the gesture is known to others, the others can also log in. Since the voiceprint information of a user is utilized in voiceprint verification, the safety is enhanced. In the prior art, a voiceprint identification method is used for verifying the identity of the login user, mainly including a voiceprint verification method in which a random numerical string/ arbitrary text and a keyboard password are combined.

Specifically: during a user registration, a client terminal receives a first voice signal generated when the user pronounces a password and a second voice signal produced when the user pronounces a random numerical string/arbitrary text generated by a server, the client terminal transmits the received voice signals to the server, the server extracts the password from the first voice signal, stores the password and obtains the acoustic characteristics of the user based on the received second voice signal.

During a user login, the client terminal receives a third voice signal generated when the user pronounces a password and a fourth voice signal produced when the user pronounces a random numerical string/arbitrary text generated by server, the client terminal transmits the received voice signals to the server, the server obtains the acoustic characteristics based on the received fourth voice signal, compares the acoustic characteristics with the acoustic characteristics obtained during the user registration, extracts the password from the third voice signal and compares the password with the password stored during the user registration, if both comparison results are consistent, the user identity verification is successful, otherwise, the user identity verification is failed. The prior art has the following defects: during the user registration and the user login, the user has to pronounce the passwords which may be exposed, resulting in low safety.

SUMMARY

The present invention provides a voiceprint verification method, apparatus, storage medium and device, in order to improve the safety of inputting a password by a user during registration and login processes.

In a first aspect, embodiments of the present invention provide a voiceprint verification method, including:

generating and displaying, by a client terminal, random identifiers of various keyboard elements having fixed identifiers, so as to enable a user to set a password by inputting a voice signal of the random identifier of at least one of the keyboard elements; and receiving, by the client terminal, a first voice signal input when the user sets the password, and transmitting the first voice signal to a server.

In a second aspect, the embodiments of the present invention further provide a voiceprint verification method, including:

receiving, by a server, a first voice signal which is input when a user sets a password and forwarded by a client terminal;

extracting, by the server, at least one random identifier from the first voice signal, wherein each of the random identifiers respectively corresponds to a keyboard element having a fixed identifier; and determining, by the server, the respective fixed identifiers of the keyboard elements corresponding to the various extracted random identifiers, and determining and storing the password set by the user according to the determined fixed identifiers.

In a third aspect, the embodiments of the present invention provide a voiceprint verification method, including:

generating and displaying, by a client terminal, random identifiers of various keyboard elements having fixed identifiers, so as to enable a user to input a password by inputting a voice signal of the random identifier of at least one of the keyboard elements during login; and receiving, by the client terminal, a third voice signal input by the user during password verification, and transmitting the third voice signal to a server.

In a fourth aspect, the embodiments of the present invention further provide a voiceprint verification method, including:

receiving, by a server, a third voice signal which is input by a user during password verification and forwarded by a client terminal;

extracting, by the server, at least one random identifier from the third voice signal, wherein each of the random identifiers respectively corresponds to a keyboard element having a fixed identifier;

determining, by the server, the respective fixed identifiers of the keyboard elements corresponding to the various extracted random identifiers, and determining a password input by the user according to the determined fixed identifiers; and comparing, by the server, the password input by the user with the password which is set by the user and pre-stored in a registration phase, obtaining a user identity authentication result according to a password comparison result, and returning the user identity authentication result to the client terminal.

In a fifth aspect, the embodiments of the present invention further provide a voiceprint verification apparatus, including:

a random identifier generating module for generating and displaying random identifiers of various keyboard elements having fixed identifiers, so as to enable a user to set a password by inputting a voice signal of the random identifier of at least one of the keyboard elements; and a first voice signal receiving and transmitting module for receiving a first voice signal input when the user sets the password, and transmitting the first voice signal to a server.

In a sixth aspect, the embodiments of the present invention further provide a voiceprint verification apparatus, including:

a first voice signal receiving module for receiving a first voice signal which is input when a user sets a password and which is sent by a client terminal;

a random identifier extracting module for extracting at least one random identifier from the first voice signal, each of the random identifiers respectively corresponding to a keyboard element having a fixed identifier; and a password storing module for determining the respective fixed identifiers of the keyboard elements corresponding to the various extracted random identifiers, and determining and storing the password set by the user according to the determined fixed identifiers.

In a seventh aspect, the embodiments of the present invention further provide a voiceprint verification apparatus, including:

a random identifier generating module for generating and displaying random identifiers of various keyboard elements having fixed identifiers, so as to enable a user to input a password by inputting a voice signal of the random identifier of at least one of the keyboard elements during login; and a third voice signal receiving and transmitting module for receiving a third voice signal input by the user during password verification, and transmitting the third voice signal to a server.

In an eighth aspect, the embodiments of the present invention further provide a voiceprint verification apparatus, including:

a third voice signal receiving module for receiving a third voice signal which is input by a user during password verification and forwarded by a client terminal;

a random identifier extracting module for extracting at least one random identifier from the third voice signal, each of the random identifiers respectively corresponding to a keyboard element having a fixed identifier;

a password determining module for determining the respective fixed identifiers of the keyboard elements corresponding to the various extracted random identifiers, and determining a password input by the user according to the determined fixed identifiers; and a user identity authentication module for comparing the password input by the user with the password which is set by the user and pre-stored in the registration phase, obtaining a user identity authentication result according to a password comparison result, and returning the user identity authentication result to the client terminal.

In a ninth aspect, the embodiments of the present invention further provide a non-volatile computer storage medium, the non-volatile computer storage medium storing one or more programs, the one or more programs when executed by an apparatus, causing the apparatus to perform operations comprising:

generating and displaying random identifiers of various keyboard elements having fixed identifiers, so as to enable a user to set a password by inputting a voice signal of the random identifier of at least one of the keyboard elements; and receiving a first voice signal input when the user sets the password, and transmitting the first voice signal to a server.

In a tenth aspect, the embodiments of the present invention further provide a non-volatile computer storage medium, the non-volatile computer storage medium storing one or more programs, the one or more programs when executed by an apparatus, causing the apparatus to perform operations comprising:

receiving a first voice signal which is input when a user sets a password and which is forwarded by a client terminal;

extracting at least one random identifier from the first voice signal, each of the random identifiers respectively corresponding to a keyboard element having a fixed identifier; and determining the respective fixed identifiers of the keyboard elements corresponding to the various extracted random identifiers, and determining and storing the password set by the user according to the determined fixed identifiers.

In an eleventh aspect, the embodiments of the present invention further provide a non-volatile computer storage medium, the non-volatile computer storage medium storing one or more programs, the one or more programs when executed by an apparatus, causing the apparatus to perform operations comprising:

generating and displaying random identifiers of various keyboard elements having fixed identifiers, so as to enable a user to input a password by inputting a voice signal of the random identifier of at least one of the keyboard elements during login; and receiving a third voice signal input by the user during password verification, and transmitting the third voice signal to a server.

In a twelfth aspect, the embodiments of the present invention further provide a non-volatile computer storage medium, the non-volatile computer storage medium storing one or more programs, the one or more programs when executed by an apparatus, causing the apparatus to perform operations comprising:

receiving a third voice signal which is input by a user during password verification and forwarded by a client terminal;

extracting at least one random identifier from the third voice signal, each of the random identifiers respectively corresponding to a keyboard element having a fixed identifier;

determining the respective fixed identifiers of the keyboard elements corresponding to the various extracted random identifiers, and determining a password input by the user according to the determined fixed identifiers; and comparing the password input by the user with the password which is set by the user and pre-stored in a registration phase, obtaining a user identity authentication result according to a password comparison result, and returning the user identity authentication result to the client terminal.

In a thirteenth aspect, the embodiments of the present invention provide a device, including:

one or more processors;

a memory; and one or more modules, which are stored in the memory and when executed by the one or more processors, perform operations comprising:

generating and displaying random identifiers of various keyboard elements having fixed identifiers, so as to enable a user to set a password by inputting a voice signal of the random identifier of at least one of the keyboard elements; and receiving a first voice signal input when the user sets the password, and transmitting the first voice signal to a server.

In a fourteenth aspect, the embodiments of the present invention provide a device, including:

one or more processors;

a memory; and one or more modules, which are stored in the memory and when executed by the one or more processors, perform operations comprising:

receiving a first voice signal which is input when a user sets a password and forwarded by a client terminal;

extracting at least one random identifier from the first voice signal, each of the random identifiers respectively corresponding to a keyboard element having a fixed identifier; and determining the respective fixed identifiers of the keyboard elements corresponding to the various extracted random identifiers, and determining and storing the password set by the user according to the determined fixed identifiers.

In a fifteenth aspect, the embodiments of the present invention provide a device, including:

one or more processors;

a memory; and one or more modules, which are stored in the memory and when executed by the one or more processors, perform operations comprising:

generating and displaying random identifiers of various keyboard elements having fixed identifiers, so as to enable a user to input a password by inputting a voice signal of the random identifier of at least one of the keyboard elements during login; and receiving a third voice signal input by the user during password verification, and transmitting the third voice signal to a server.

In a sixteenth aspect, the embodiments of the present invention provide a device, including:

one or more processors;

a memory; and one or more modules, which are stored in the memory and when executed by the one or more processors, perform operations comprising:

receiving a third voice signal which is input by a user during password verification and forwarded by a client terminal;

extracting at least one random identifier from the third voice signal, each of the random identifiers respectively corresponding to a keyboard element having a fixed identifier;

determining the respective fixed identifiers of the keyboard elements corresponding to the various extracted random identifiers, and determining a password input by the user according to the determined fixed identifiers; and comparing the password input by the user with the password which is set by the user and pre-stored in a registration phase, obtaining a user identity authentication result according to a password comparison result, and returning the user identity authentication result to the client terminal.

According to the present invention, the client terminal generates and displays the random identifiers of the various keyboard elements having the fixed identifiers, and the client terminal interacts with the server to implement a random verification mode of the fixed password in user registration and login processes, such that the set fixed password has been randomized into the random identifiers when the user pronounces the password, therefore in the registration and login processes, even if the pronounced password is heard by others, the password is invisible to the others and cannot be used by the others, thereby avoiding the problem in the prior art that the fixed password is visible in the traditional method in which a voiceprint is combined with a fixed password, and improving the safety.

BRIEF DESCRIPTION OF THE DRAWINGS

FIG. 6 is a flowchart of a voiceprint verification method provided by a third embodiment of the present invention;

FIG. 7 is a flowchart of a voiceprint verification method provided by a fourth embodiment of the present invention;

FIG. 8 is a structural schematic diagram of a voiceprint verification apparatus provided by a fifth embodiment of the present invention;

DETAILED DESCRIPTION OF PREFERRED EMBODIMENTS

The present application will be described in details below in conjunction with the accompanying drawings and embodiments. It should be appreciated that the embodiments described herein are merely provided to illustrate the present invention, but not to limit the present invention. In addition, it should also be noted that only the related parts rather than all the parts of the present invention are shown in the accompanying drawings for the ease of description.

First Embodiment

Figure 1:
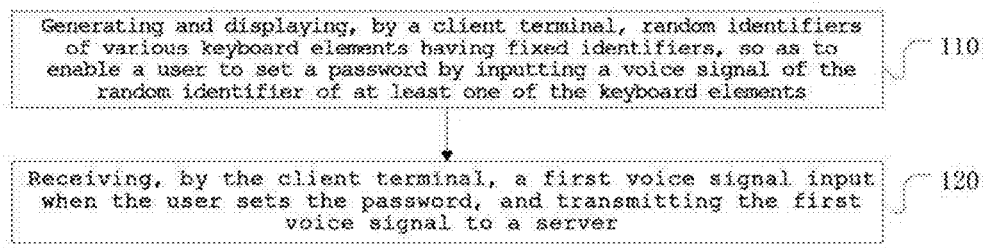
FIG. 1 is a flowchart of a voiceprint verification method provided by a first embodiment of the present invention.

FIG. 1 is a flowchart of a voiceprint verification method provided by a first embodiment of the present invention. The embodiment may be applicable to a user registration system, such as passport, and other similar fast user registration systems. The method is executed by a user client terminal, and the method of the embodiment specifically includes the following operations:

110: The client terminal generates and displays random identifiers of various keyboard elements having fixed identifiers, so as to enable a user to set a password by inputting a voice signal of the random identifier of at least one of the keyboard elements.

The fixed identifiers of the keyboard elements are letters, numbers or pictures of articles, and the random identifiers of the keyboard elements are letters or numbers. The client terminal generates the random identifiers of various keyboard elements having the fixed identifiers according to a certain algorithm, so that the fixed identifier of each keyboard element corresponds to a random identifier. To facilitate the subsequent extraction of the password, the algorithm needs to be stored at a server in advance.

Figure 2A:
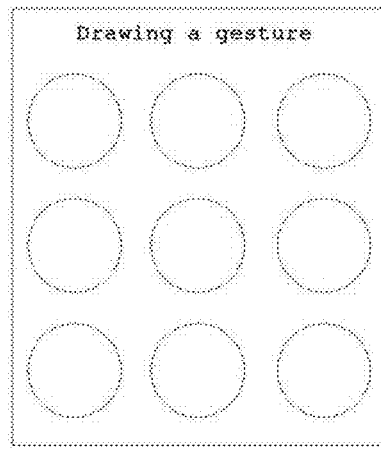
FIG. 2a is a schematic diagram of keyboard elements which are matrix elements of a 3×3 matrix used for setting a gesture password provided by the first embodiment of the present invention.
Figure 2B:
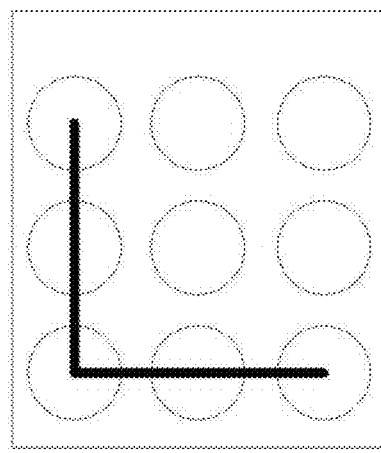
FIG. 2b is a schematic diagram of setting the gesture password on the matrix elements of the 3×3 matrix provided by the first embodiment of the present invention.
Figure 2C:
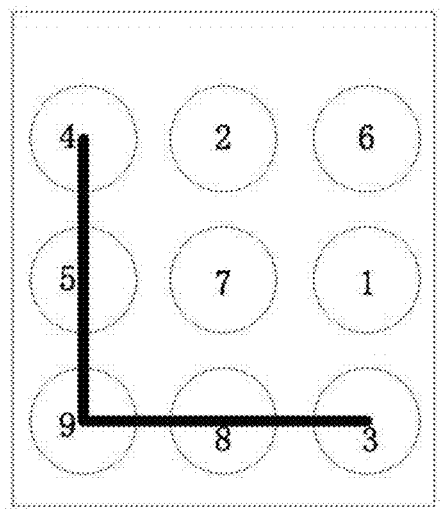
FIG. 2c is a schematic diagram of displaying random identifiers on the matrix elements of the 3×3 matrix provided by the first embodiment of the present invention.

Specifically, the keyboard elements may be the matrix elements of a 3×3 matrix used for setting a gesture password, as shown in FIG. 2a, the client terminal generates the 3×3 matrix including 9 matrix elements, and the matrix elements of the 3×3 matrix have the fixed identifiers (the fixed identifiers of the matrix elements are not shown in the embodiment). The user may set the gesture password in a registration process, for example, an L-shaped gesture in FIG. 2b. To avoid the exposure of the password gesture, it is not necessarily to draw the gesture on a screen of the client. The fixed identifier of each matrix element corresponds to one random identifier, the random identifier is a letter or a number, exemplarily, the random identifier of the embodiment is a number, as shown in FIG. 2c. The random identifier corresponding to the fixed identifier of each matrix element is not limited to a letter or a number, and may also be a plurality of letter strings or number strings. The user may pronounce the random identifiers of the matrix elements of the 3×3 matrix having the fixed identifiers, which are generated by the client terminal and, according to the gesture path set during the registration. In the embodiment, the user pronounces "45983" to set the password, at this time, the password set by the user is not 45983, but is the fixed identifier corresponding to the gesture path.

Figure 3:
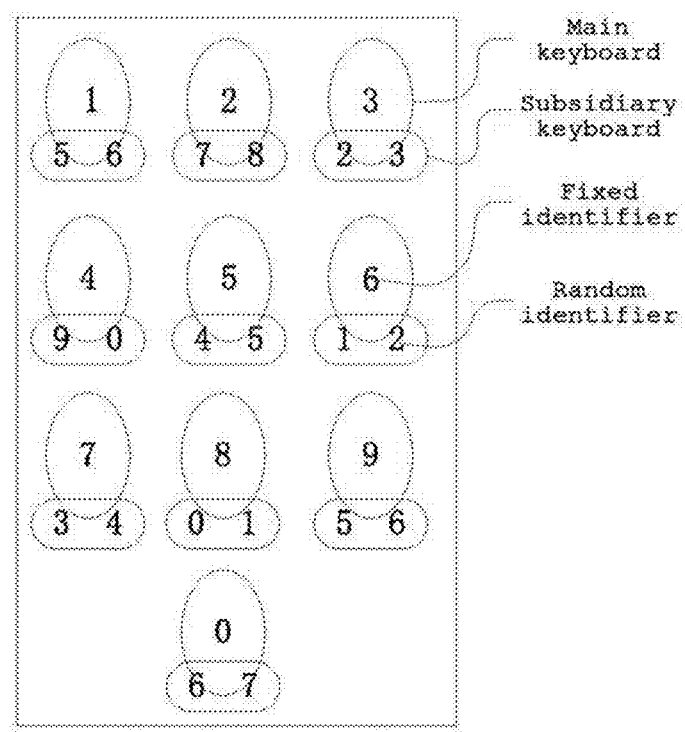
FIG. 3 is a schematic diagram where the keyboard element is a keyboard element of a main keyboard in a main-subsidiary keyboard provided by the first embodiment of the present invention.

The keyboard elements may also be keyboard elements of a main keyboard in a main-subsidiary keyboard. Exemplarily, as shown in FIG. 3, the main keyboard generated by the client has 9 keyboard elements. The keyboard elements of the main keyboard all have fixed identifiers 1-9. The random identifiers of the keyboard elements of the main keyboard are displayed on a corresponding subsidiary keyboard, and the random identifiers of the keyboard elements of the main keyboard are exemplarily set as two numbers in the embodiments. The random identifiers on the subsidiary keyboard will be randomized again every time the user inputs the voice signal. When registering, the user presets a password, for example, 1840, under the current keyboard configuration, the user only needs to pronounce the corresponding random identifiers 56019067 on the subsidiary keyboards. To improve the accuracy, the user may pronounce for multiple times when registering, for example, 3 times. Here, the registered password of the user is 1840, but the random character string 56019067 is pronounced.

Figure 4:
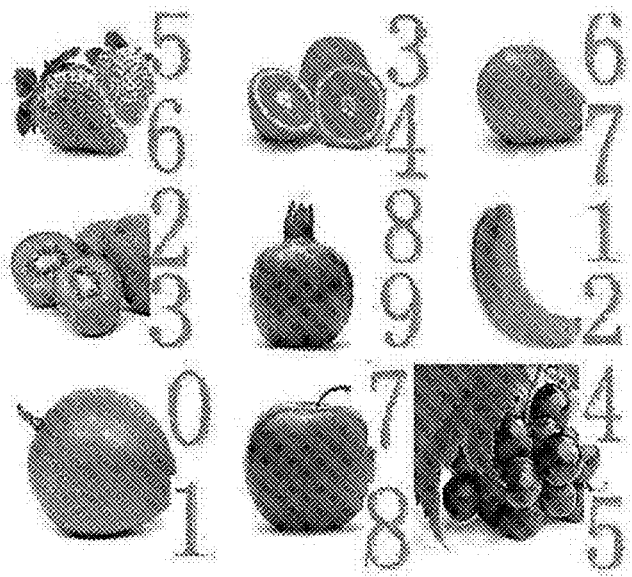
FIG. 4 is a schematic diagram where the keyboard element is a keyboard element displayed in a fruit form in an animated keyboard provided by the first embodiment of the present invention.

The keyboard elements may also be keyboard elements displayed in the form of articles in an animated keyboard. The keyboard elements displayed in the form of articles may be keyboard elements displayed in the form of fruits or keyboard elements displayed in the form of animals. As shown in FIG. 4, the client terminal generates the keyboard elements displayed in the form of fruits, the positions of fruits in the keyboard are fixed to serve as the fixed identifiers, and a random identifier is generated for each kind of fruit. Every time the user records the voice signal, the random identifiers of the fruits will be randomized again. During the registration, the preset password of the user may be a favorite fruit combination, for example, strawberry+apple, and under the current keyboard configuration, the user only needs to pronounce the random identifiers 5678 corresponding to the keyboard elements of strawberry and apple.

120: The client terminal receives a first voice signal input when the user sets the password, and transmits the first voice signal to the server.

The first voice signal is a voice signal of the random identifier of at least one of the keyboard elements, which is input by the user according to the random identifiers of the various keyboard elements having the fixed identifier and generated and displayed by the client and a preset password thereof during the registration. For example, in step 110, when the keyboard elements are the matrix elements of the 3×3 matrix used for setting the gesture password, the voice signal pronounced is "45983."

The client terminal transmits the first voice signal to the server, and the server completes the subsequent extraction of the acoustic characteristics and the storage of the password, etc.

According to the embodiment of the present invention, the client terminal generates and displays the random identifiers of the various keyboard elements having the fixed identifiers, and the client interacts with the server to implement a random verification mode of the fixed password in the user registration process, such that the set fixed password has been randomized into the random identifiers when the user pronounces the password, therefore in the registration process, even if the password pronounced is heard by others, the password is invisible to the others and cannot be used by the others, thereby avoiding the problem in the prior art that the fixed password is visible in the traditional method in which a voiceprint is combined with a fixed password, and improving the safety.

On the basis of the above technical solutions, preferably, the method further includes:

the client terminal receives a second voice signal input by the user and transmits the second voice signal to the server.

The second voice signal is a voice signal corresponding to a content sent by the server and in need to be pronounced by the user. The content sent by the server and requested to be pronounced by the user may be a random number string or an arbitrary text.

The reception and transmission of the second voice signal may be executed before, after or at the same time as the reception and transmission of the first voice signal. The sequential relationship of the reception and transmission of the second voice signal and the reception and transmission of the first voice signal is not limited in the present invention.

The client terminal transmits the second voice signal to the server, thus allowing the server to extract the acoustic characteristic information of the user, since the second voice signal is the content sent by the server and in need to be pronounced by the user, an attack from a voice synthesized by a machine can be prevented, and thus the safety is further improved.

Second Embodiment

Figure 5:
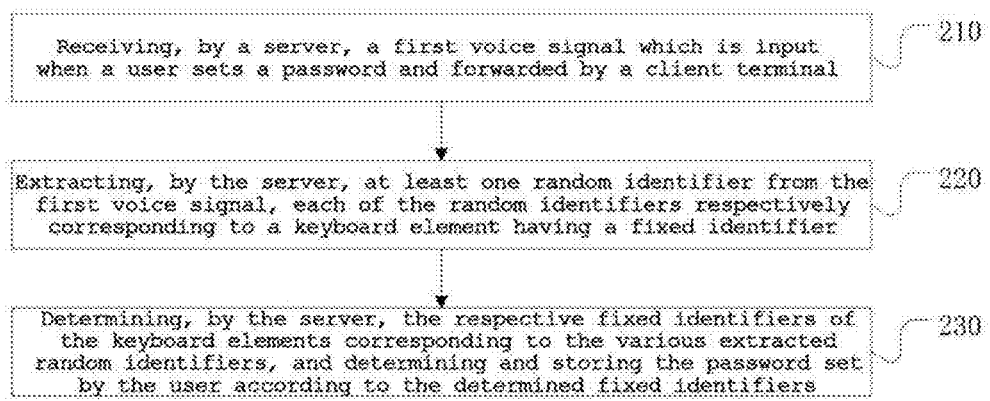
FIG. 5 is a flowchart of a voiceprint verification method provided by a second embodiment of the present invention.

FIG. 5 is a flowchart of a voiceprint verification method provided by a second embodiment of the present invention, and the method may be executed by a server. As shown in FIG. 5, the method includes the following steps:

210: The server receives a first voice signal, which was input into when the user sets a password, and forwarded by the client terminal.

The first voice signal, which was input into when the user sets the password, and forwarded by the client terminal refers to a voice signal of the random identifier of at least one of the keyboard elements, which was input by the user according to the random identifiers of the various keyboard elements having the fixed identifier, generated and displayed by the client terminal and a preset password thereof during the registration.

220: The server extracts at least one random identifier from the first voice signal, wherein each of the random identifiers respectively corresponds to a keyboard element having a fixed identifier.

The fixed identifiers of the keyboard elements are letters, numbers or pictures of articles, and the random identifiers of the keyboard elements are letters or numbers.

Specifically, the keyboard elements are matrix elements of a 3×3 matrix used for setting a gesture password, keyboard elements of a main keyboard in a main-subsidiary keyboard, or keyboard elements displayed in the form of articles in an animated keyboard.

When the keyboard elements are the matrix elements of the 3×3 matrix used for setting the gesture password, for example, the first voice signal is a voice signal, forwarded by the client terminal after being generated by the user by pronouncing the random identifiers of the matrix elements of the 3×3 matrix having the fixed identifiers, generated by the client terminal, under the current keyboard configuration according to the set gesture "L" path during the registration. The server extracts the random identifier "45983" from the first voice signal.

When the keyboard elements are the keyboard elements of the main keyboard in the main-subsidiary keyboard, the random identifiers of the keyboard elements of the main keyboard are displayed on the corresponding subsidiary keyboard. Here, the first voice signal is a voice signal, forwarded by the client terminal after being generated by the user by pronouncing the corresponding random identifiers on the subsidiary keyboards according to the fixed identifiers of the keyboard elements on the main keyboard corresponding to a preset password, for example, "1840," under the current keyboard configuration during the registration. The server extracts the random identifier, for example, "56019067," from the first voice signal.

When the keyboard elements are the keyboard elements displayed in the form of articles in the animated keyboard, the keyboard elements displayed in the form of articles are keyboard elements displayed in the form of fruits or keyboard elements displayed in the form of animals. Here, the first voice signal is a voice signal, forwarded by the client terminal after being generated by the user by pronouncing the random identifiers corresponding to the keyboard elements of strawberry and apple according to the fruit combination password set during the registration, for example, strawberry+apple, under the current keyboard configuration. The server extracts the random identifier "5678" from the first voice signal.

230: The server determines the respective fixed identifiers of the keyboard elements corresponding to the various extracted random identifiers, and determines and stores the password set by the user according to the determined fixed identifiers.

The server stores in advance the algorithm which is adopted when the client terminal randomly generates the random identifiers of the keyboard elements having the fixed identifiers, and determines the fixed identifiers of the keyboard elements corresponding to the respective various extracted random identifiers according to the algorithm.

When the keyboard elements are the matrix elements of the 3×3 matrix used for setting the gesture password, the server determines the respective fixed identifiers of the matrix elements of the 3×3 matrix corresponding to the individual random identifiers in the random identifier "45983" extracted from the first voice signal according to the pre-stored algorithm, determines the gesture path set by the user as "L" according to the fixed identifiers, and then stores the gesture path.

When the keyboard elements are the keyboard elements of the main keyboard in the main-subsidiary keyboard, the server determines the respective fixed identifiers of the keyboard elements of the main keyboard corresponding to the individual random identifiers in the random identifier "56019067" extracted from the first voice signal according to the pre-stored algorithm, determines the password set by the user as "1840" according to the fixed identifiers, and then stores the password.

When the keyboard elements are the keyboard elements displayed in the form of articles in the animated keyboard, the server determines the respective fruit types of the animated keyboard elements corresponding to the individual random identifiers in the random identifier "5678" extracted from the first voice signal according to the pre-stored algorithm, determines the password set by the user as "strawberry apple" according to the fruit types, and then stores the password.

According to the embodiment of the present invention, the server extracts the random identifiers in the first voice signal forwarded by the client terminal and determines the fixed identifiers corresponding to the random identifiers to obtain the password set by the user, implementing a random voiceprint verification mode of the fixed password in the user registration process, such that the set fixed password has been randomized into the random identifiers when the user pronounces the password, therefore in the registration process, even if the password pronounced is heard by others, the password is invisible to the others and cannot be used by the others, thereby avoiding the problem in the prior art that the fixed password is visible in the traditional method in which a voiceprint is combined with a fixed password, and improving the safety.

On the basis of the above embodiment, preferably, the method further includes:

obtaining and storing, by the server, acoustic characteristic information of the user; or receiving, by the server, a second voice signal input by the user and forwarded by the client terminal, and obtaining and storing the acoustic characteristic information of the user according to the second voice signal.

The second voice signal is a voice signal corresponding to a content sent by the server in advance and in need to be pronounced by the user. The content sent by the server and in need to be pronounced by the user may be a random number string or an arbitrary text.

In the user registration phase, the acoustic characteristic information of the user obtained from the first voice signal or the second voice signal is stored, the random voiceprint verification mode of voiceprint and fixed password in the user registration process is implemented, and meanwhile, the acoustic characteristics of the user and the contents of the set password are recorded to provide dual verification guarantee. Moreover, since the second voice signal is the content sent by the server and in need to be pronounced by the user, the attack from a voice synthesized by a machine can be prevented, and thus the safety is further improved.

Third Embodiment

FIG. 6 is a flowchart of a voiceprint verification method provided by a third embodiment of the present invention. The embodiment may be applicable to a user registration system, such as passport, and other similar fast user registration systems. The method is executed by a user client terminal, and the method of the embodiment specifically includes the following operations:

310: The client terminal generates and displays random identifiers of various keyboard elements having fixed identifiers, so as to enable a user to input a password by inputting a voice signal of the random identifier of at least one of the keyboard elements during login.

The fixed identifiers of the keyboard elements are letters, numbers or pictures of articles, and the random identifiers of the keyboard elements are letters or numbers. The client terminal generates the random identifiers of various keyboard elements having the fixed identifiers according to a certain algorithm, so that the fixed identifier of each keyboard element corresponds to a random identifier. To facilitate the subsequent extraction of the password, the algorithm needs to be stored at a server in advance.

Specifically, the keyboard elements may be matrix elements of a 3×3 matrix used for setting a gesture password. The client terminal generates the 3×3 matrix including 9 matrix elements, and the matrix elements of the 3×3 matrix have the fixed identifiers. The fixed identifier of each matrix element corresponds to a random identifier. The random identifier is a letter or a number, the random identifier corresponding to the fixed identifier of each matrix element is not limited to a letter or a number, and may also be a plurality of letter strings or number strings. The user may pronounce the random identifiers of the matrix elements of the 3×3 matrix having the fixed identifiers, which are generated by the corresponding client terminal, according to the gesture path set in the registration phase during the login, and in the embodiment, the user pronounces "37128" to log in.

The keyboard elements may also be keyboard elements of a main keyboard in a main-subsidiary keyboard. The keyboard elements of the main keyboard have fixed identifiers. The random identifiers of the keyboard elements of the main keyboard are displayed on a corresponding subsidiary keyboard, and the random identifiers on the subsidiary keyboard will be randomized again every time the user inputs the voice signal. The password set by the user is a combination of the fixed identifiers on the main keyboards, the user may pronounce the random identifiers of the matrix elements of the 3×3 matrix having the fixed identifiers, which are generated by the corresponding client terminal, according to the password set in the registration phase during the login, for example, in the embodiment, the user pronounces "02571639" to log in.

The keyboard elements may also be keyboard elements displayed in the form of articles in an animated keyboard. The keyboard elements displayed in the form of articles may be keyboard elements displayed in the form of fruits or keyboard elements displayed in the form of animals. For example, the client terminal generates the keyboard elements displayed in the form of fruits, the positions of fruits in the keyboard are fixed to serve as the fixed identifiers, and a random identifier is generated for each kind of fruit. Every time the user records the voice signal, the random identifiers of the fruits will be randomized again. The preset password of the user may be a favorite fruit combination, for example, strawberry+apple. During the login, the user pronounces the random identifiers of the animated keyboard elements having different fruit types, which are generated by the corresponding client terminal, according to the password set in the registration phase, for example, in the embodiment, the user pronounces "1234" to log in.

320: The client terminal receives a third voice signal input by the user during password verification, and transmits the third voice signal to a server.

The third voice signal is a voice signal of the random identifier of at least one of the keyboard elements, which is input by the user according to the random identifiers of the various keyboard elements having the fixed identifier and generated and displayed by the client terminal and a preset password thereof during the login. For example, in step 310, when the keyboard elements are the matrix elements of the 3×3 matrix used for setting the gesture password, the voice signal pronounced is "37128."

The client terminal transmits the third voice signal to the server, and the server completes the subsequent extraction of the acoustic characteristics and the password, etc.

According to the embodiment of the present invention, the client terminal generates and displays the random identifiers of the various keyboard elements having the fixed identifiers, and the client terminal interacts with the server to implement a random verification mode of the fixed password in the user login process, such that the set fixed password has been randomized into the random identifiers when the user pronounces the password, therefore in the login process, even if the password pronounced is heard by others, the password is invisible to the others and cannot be used by the others, thereby avoiding the problem in the prior art that the fixed password is visible in the traditional method in which a voiceprint is combined with a fixed password, and improving the safety.

On the basis of the above technical solutions, preferably, the method further includes:
the client terminal receives a fourth voice signal input by the user and transmits the fourth voice signal to the server; and the fourth voice signal is a voice signal corresponding to a content sent by the server and in need to be pronounced by the user. The content sent by the server and in need to be pronounced by the user may be a random number string or an arbitrary text.

The reception and transmission of the fourth voice signal may be executed before, after or at the same time as the reception and transmission of the third voice signal. The sequential relationship of the reception and transmission of the fourth voice signal and the reception and transmission of the third voice signal is not limited in the present invention.

The client terminal transmits the fourth voice signal to the server, thus allowing the server to extract the acoustic characteristic information of the user, since the fourth voice signal is the content sent by the server and in need to be pronounced by the user, the attack from a voice synthesized by a machine can be prevented, and thus the safety is further improved.

Fourth Embodiment

FIG. 7 is a flowchart of a voiceprint verification method provided by a fourth embodiment of the present invention, and the method is executed by the server. As shown in FIG. 7, the method includes the following steps:

410: The server receives a third voice signal which was input by the user during password verification, and forwarded by the client terminal.

The third voice signal, which was input by the user during the password verification, and forwarded by the client terminal refers to a voice signal of the random identifier of at least one of the keyboard elements, which was input by the user according to the random identifiers of the various keyboard elements having the fixed identifier, generated and displayed by the client terminal and a preset password thereof during the login.

420: The server extracts at least one random identifier from the third voice signal, wherein each of the random identifiers respectively corresponds to a keyboard element having a fixed identifier.

The fixed identifiers of the keyboard elements are letters, numbers or pictures of articles, and the random identifiers of the keyboard elements are letters or numbers.

Specifically, the keyboard elements are matrix elements of a 3×3 matrix used for setting a gesture password, keyboard elements of a main keyboard in a main-subsidiary keyboard, or keyboard elements displayed in the form of articles in an animated keyboard.

When the keyboard elements are the matrix elements of the 3×3 matrix used for setting the gesture password, the third voice signal is a voice signal, forwarded by the client terminal after being generated by the user by pronouncing the random identifiers of the matrix elements of the 3×3 matrix having the fixed identifiers, generated by the client terminal, under the current keyboard configuration according to the gesture path set during the registration. The server extracts the random identifier, for example, "37128," from the third voice signal.

When the keyboard elements are the keyboard elements of the main keyboard in the main-subsidiary keyboard, the random identifiers of the keyboard elements of the main keyboard are displayed on the corresponding subsidiary keyboard. Here, the third voice signal is a voice signal, forwarded by the client terminal after being generated by the user by pronouncing the corresponding random identifiers on the subsidiary keyboard according to his password set during the registration under the current keyboard configuration. The server extracts the random identifier, for example, "02571639," from the third voice signal.

When the keyboard elements are the keyboard elements displayed in the form of articles in the animated keyboard, the keyboard elements displayed in the form of articles are keyboard elements displayed in the form of fruits or keyboard elements displayed in the form of animals. Here, the third voice signal is a voice signal, forwarded by the client terminal after being generated by the user by pronouncing the random identifiers corresponding to the animated keyboard elements according to the fruit combined password set during the registration under the current keyboard configuration. The server extracts the random identifier, for example, "1234," from the third voice signal.

430: The server determines the respective fixed identifiers of the keyboard elements corresponding to the various extracted random identifiers, and determines the password input by the user according to the determined fixed identifiers.

The server stores in advance the algorithm which is adopted when the client terminal randomly generates the random identifiers of the keyboard elements having the fixed identifiers, and determines the fixed identifiers of the keyboard elements corresponding to the respective various extracted random identifiers according to the algorithm.

When the keyboard elements are the matrix elements of the 3×3 matrix used for setting the gesture password, the server determines the respective fixed identifiers of the matrix elements of the 3×3 matrix corresponding to the individual random identifiers in the random identifier "37128" extracted from the third voice signal according to the pre-stored algorithm, determines the password input by the user according to the fixed identifiers, for example, determines the password corresponding to the random identifier "37128" pronounced by the user as a gesture L according to the algorithm.

When the keyboard elements are the keyboard elements of the main keyboard in the main-subsidiary keyboard, the server determines the respective fixed identifiers of the keyboard elements of the main keyboard corresponding to the individual random identifiers in the random identifier "02571639" extracted from the third voice signal according to the pre-stored algorithm, and determines the password input by the user according to the fixed identifiers, for example, determines the password corresponding to the random identifier "02571639" pronounced by the user as "1840" according to the algorithm.

When the keyboard elements are the keyboard elements displayed in the form of articles in the animated keyboard, the server determines the respective fruit types of the animated keyboard elements corresponding to the individual random identifiers in the random identifier "1234" extracted from the second voice signal according to the pre-stored algorithm, and determines the fruit combination password input by the user according to the fruit types, for example, determines the password corresponding to the random identifier "1234" pronounced by the user as "strawberry apple" according to the algorithm.

440: The server compares the password input by the user with the password which was set by the user and pre-stored in the registration phase, obtains a user identity authentication result according to the password comparison result, and returns the user identity authentication result to the client terminal.

The server compares the password input by the user and obtained in step 430 with the password which was set by the user and pre-stored in the registration phase. For example, when the keyboard elements are the keyboard elements of the main keyboard in the main-subsidiary keyboard, the password input by the user and obtained by the server is the gesture "L," if the password which was set by the user and pre-stored in the registration phase is also the gesture "L," the user identity authentication result is that the user identity is valid; otherwise, the user identity is invalid.

Or, when the keyboard elements are the keyboard elements of the main keyboard in the main-subsidiary keyboard, the password input by the user and obtained by the server is "1840," if the password which was set by the user and pre-stored in the registration phase is also "1840," the user identity authentication result is that the user identity is valid, otherwise, the user identity is invalid.

Or, when the keyboard elements are the keyboard elements displayed in the form of articles in the animated keyboard, the password input by the user and obtained by the server is "strawberry apple," if the password which was set by the user and pre-stored in the registration phase is also "strawberry apple," the user identity authentication result is that the user identity is valid, and otherwise, the user identity is invalid.

According to the embodiment of the present invention, the server extracts the random identifiers in the third voice signal forwarded by the client terminal and determines the fixed identifiers corresponding to the random identifiers to obtain the password input by the user, implementing a random verification mode of the fixed password in the user login process, such that the set fixed password has been randomized into the random identifiers when the user pronounces, therefore in the login process, even if the password pronounced is heard by others, the password is invisible to the others and cannot be used by the others, thereby avoiding the problem in the prior art that the fixed password is visible in the traditional method in which a voiceprint is combined with a fixed password, and improving the safety.

On the basis of the above embodiment, preferably, the method further includes:
obtaining, by the server, acoustic characteristic information of the user according to the third voice signal; or
receiving, by the server, a fourth voice signal input by the user and forwarded by the client terminal, and obtaining the acoustic characteristic information of the user according to the fourth voice signal, wherein the fourth voice signal is a voice signal corresponding to a content sent by the server in advance and in need to be pronounced by the user; and
comparing, by the server, the obtained acoustic characteristic information with the acoustic characteristic information of the user stored in the registration phase in advance.

Obtaining the user identity authentication result according to the password comparison result includes:
obtaining the user identity authentication result according to the password comparison result and a comparison result of the acoustic characteristic information. Specifically, if the password comparison result and the comparison result of the acoustic characteristic information are consistent, the user identity authentication result is that the user passes the identity authentication, and if any one or two of the password comparison result and the comparison result of the acoustic characteristic information are inconsistent, the user identity authentication result is that the identity authentication is failed.

In the user login phase, since the acoustic characteristic information of the user obtained from the third voice signal or the fourth voice signal is stored, the random voiceprint verification mode of voiceprint and fixed password in the user login process is implemented, and meanwhile, the acoustic characteristics of the user and the contents of the input password are comprehensively considered during the login and verification to provide dual verification guarantee. Moreover, since the fourth voice signal is the content sent by the server and in need to be pronounced by the user, the attack from a voice synthesized by a machine can be prevented, and thus the safety is further improved.

Fifth Embodiment

FIG. 8 is a structural schematic diagram of a voiceprint verification apparatus provided by a fifth embodiment of the present invention, the voiceprint verification apparatus is applied to a user registration phase, the voiceprint verification apparatus may be arranged in a terminal device, and the voiceprint verification apparatus specifically includes:
a random identifier generating module 510, used for generating and displaying random identifiers of various keyboard elements having fixed identifiers, so as to enable a user to set a password by inputting a voice signal of the random identifier of at least one of the keyboard elements; and
a first voice signal receiving and transmitting module 520, used for receiving a first voice signal input when the user sets the password, and transmitting the first voice signal to a server.

Specifically, the keyboard elements are:
matrix elements of a 3×3 matrix used for setting a gesture password; or
keyboard elements of a main keyboard in a main-subsidiary keyboard; or
keyboard elements displayed in the form of articles in an animated keyboard.

The keyboard elements displayed in the form of articles are keyboard elements displayed in the form of fruits or keyboard elements displayed in the form of animals.

The fixed identifiers of the keyboard elements are letters, numbers or pictures of articles, and the random identifiers of the keyboard elements are letters or numbers.

Further, the voiceprint verification apparatus further includes: a second voice signal receiving and transmitting module 530, used for receiving a second voice signal input by the user and transmitting the second voice signal to the server; and the second voice signal is a voice signal corresponding to a content sent by the server and in need to be pronounced by the user.

According to the embodiment, by means of the sequential work of the modules of the apparatus, the interaction of the client terminal and the server is realized, the voiceprint verification method provided by any embodiment of the present invention can be executed, and corresponding functional modules and beneficial effects of the executed method are provided.

Sixth Embodiment

Figure 9:
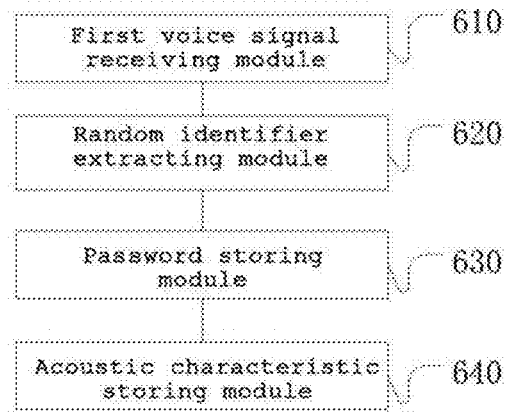
FIG. 9 is a structural schematic diagram of a voiceprint verification apparatus provided by a sixth embodiment of the present invention.

FIG. 9 is a structural schematic diagram of a voiceprint verification apparatus provided by a sixth embodiment of the present invention, the voiceprint verification apparatus is applied to a user registration phase, the voiceprint verification apparatus may be arranged in a server, and the voiceprint verification apparatus specifically includes:
a first voice signal receiving module 610, used for receiving a first voice signal which is input when a user sets a password and which is forwarded by a client terminal;
a random identifier extracting module 620, used for extracting at least one random identifier from the first voice signal, wherein each of the random identifiers respectively corresponds to a keyboard element having a fixed identifier; and
a password storing module 630, used for determining the respective fixed identifiers of the keyboard elements corresponding to the various extracted random identifiers, and determining and storing the password set by the user according to the determined fixed identifiers.

Specifically, the keyboard elements are:
matrix elements of a 3×3 matrix used for setting a gesture password; or,
keyboard elements of a main keyboard in a main-subsidiary keyboard; or,
keyboard elements displayed in the form of articles in an animated keyboard.

The keyboard elements displayed in the form of articles are keyboard elements displayed in the form of fruits or keyboard elements displayed in the form of animals.

The fixed identifiers of the keyboard elements are letters, numbers or pictures of articles, and the random identifiers of the keyboard elements are letters or numbers.

Further, the voiceprint verification apparatus further includes: an acoustic characteristic storing module 640, used for obtaining and storing the acoustic characteristic information of the user according to the first voice signal; or receiving, by the server, a second voice signal input by the user and forwarded by the client terminal, and obtaining and storing the acoustic characteristic information of the user according to the second voice signal. The second voice signal is a voice signal corresponding to a content sent by the server and in need to be pronounced by the user.

According to the embodiment, by means of the sequential work of the modules of the apparatus, the interaction of the client terminal and the server is realized, the voiceprint verification method provided by any embodiment of the present invention can be executed, and corresponding functional modules and beneficial effects for executing the method are provided.

Seventh Embodiment

Figure 10:
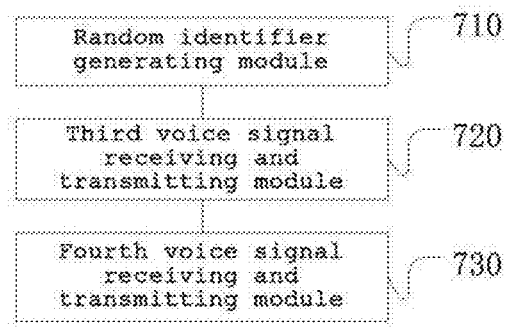
FIG. 10 is a structural schematic diagram of a voiceprint verification apparatus provided by a seventh embodiment of the present invention.

FIG. 10 is a structural schematic diagram of a voiceprint verification apparatus provided by a seventh embodiment of the present invention, the voiceprint verification apparatus is applied to a user login phase, the voiceprint verification apparatus may be arranged in a terminal device, and the voiceprint verification apparatus specifically includes:
a random identifier generating module 710, used for generating and displaying random identifiers of various keyboard elements having fixed identifiers, so as to enable a user to input a password by inputting a voice signal of the random identifier of at least one of the keyboard elements during the login; and a third voice signal receiving and transmitting module 720, used for receiving a third voice signal input by the user during password verification, and transmitting the third voice signal to a server.

Specifically, the keyboard elements are:
matrix elements of a 3×3 matrix used for setting a gesture password; or
keyboard elements of a main keyboard in a main-subsidiary keyboard; or
keyboard elements displayed in the form of articles in an animated keyboard.

The keyboard elements displayed in the form of articles are keyboard elements displayed in the form of fruits or keyboard elements displayed in the form of animals.

The fixed identifiers of the keyboard elements are letters, numbers or pictures of articles, and the random identifiers of the keyboard elements are letters or numbers.

Further, the voiceprint verification apparatus further includes: a fourth voice signal receiving and transmitting module 730, used for receiving a fourth voice signal input by the user and transmitting the fourth voice signal to the server; and the fourth voice signal is a voice signal corresponding to a content sent by the server and in need to be pronounced by the user.

According to the embodiment, by means of the sequential work of the modules of the apparatus, the interaction of the client terminal and the server is realized, the voiceprint verification method provided by any embodiment of the present invention can be executed, and corresponding functional modules and beneficial effects for executing the method are provided.

Eighth Embodiment

Figure 11:
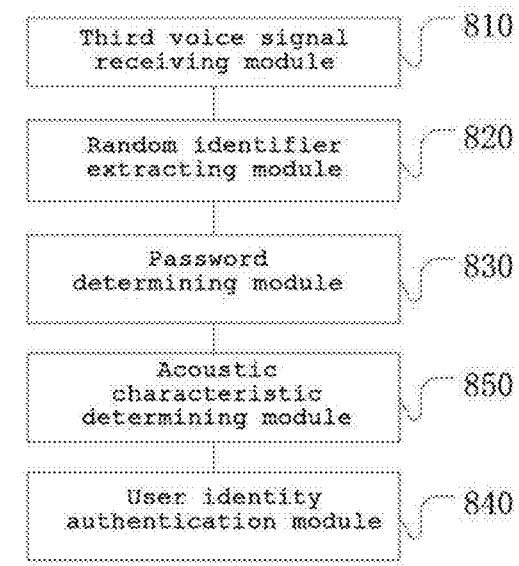
FIG. 11 is a structural schematic diagram of a voiceprint verification apparatus provided by an eighth embodiment of the present invention.

FIG. 11 is a structural schematic diagram of a voiceprint verification apparatus provided by an eighth embodiment of the present invention, the voiceprint verification apparatus is applied to a user login phase, the voiceprint verification apparatus may be arranged in a server, and the voiceprint verification apparatus specifically includes:
a third voice signal receiving module 810, used for receiving a third voice signal which is input by a user during password verification, and forwarded by a client terminal;
a random identifier extracting module 820, used for extracting at least one random identifier from the third voice signal, wherein each of the random identifiers respectively corresponds to a keyboard element having a fixed identifier;
a password determining module 830, used for determining the respective fixed identifiers of the keyboard elements corresponding to the various extracted random identifiers, and determining a password input by the user according to the determined fixed identifiers; and
a user identity authentication module 840, used for comparing the password input by the user with the password which was set by the user and pre-stored in the registration phase, obtaining a user identity authentication result according to the password comparison result, and returning the user identity authentication result to the client terminal.

Specifically, the keyboard elements are:
matrix elements of a 3×3 matrix used for setting a gesture password; or
keyboard elements of a main keyboard in a main-subsidiary keyboard; or
keyboard elements displayed in the form of articles in an animated keyboard.

The keyboard elements displayed in the form of articles are keyboard elements displayed in the form of fruits or keyboard elements displayed in the form of animals.

The fixed identifiers of the keyboard elements are letters, numbers or pictures of articles, and the random identifiers of the keyboard elements are letters or numbers.

Further, the voiceprint verification apparatus further includes: an acoustic characteristic determining module 850, used for obtaining acoustic characteristic information of the user according to the third voice signal; or, receiving a fourth voice signal input by the user and forwarded by the client terminal, and obtaining the acoustic characteristic information of the user according to the fourth voice signal, wherein the fourth voice signal is a voice signal corresponding to a content sent by the server in advance and in need to be pronounced by the user; and comparing the obtained acoustic characteristic information with the acoustic characteristic information of the user stored in the registration phase in advance.

The user identity authentication module 840 is further used for obtaining the user identity authentication result according to the password comparison result and the comparison result of the acoustic characteristic information, and returning the user identity authentication result to the client terminal.

According to the embodiment, by means of the sequential work of the modules of the apparatus, the interaction of the client terminal and the server is realized, the voiceprint verification method provided by any embodiment of the present invention can be executed, and corresponding functional modules and beneficial effects for executing the method are provided.

Ninth Embodiment

The embodiment of the present invention further provides a non-volatile computer storage medium storing one or more programs which when executed by an apparatus, cause the apparatus to perform the following operations:
generating and displaying random identifiers of various keyboard elements having fixed identifiers, so as to enable a user to set a password by inputting a voice signal of the random identifier of at least one of the keyboard elements; and
receiving a first voice signal input when the user sets the password, and transmitting the first voice signal to a server.

When the storage medium causes the apparatus to perform the above-mentioned operations, preferably, the operations further include:
receiving a second voice signal input by the user and transmitting the second voice signal to the server; and the second voice signal is a voice signal corresponding to a content sent by the server and in need to be pronounced by the user.

Further, the keyboard elements are:
matrix elements of a 3×3 matrix used for setting a gesture password; or
keyboard elements of a main keyboard in a main-subsidiary keyboard; or
keyboard elements displayed in the form of articles in an animated keyboard.

Further, the keyboard elements displayed in the form of articles are:
keyboard elements displayed in the form of fruits or keyboard elements displayed in the form of animals.

Further, the fixed identifiers of the keyboard elements are letters, numbers or pictures of articles, and the random identifiers of the keyboard elements are letters or numbers.

Tenth Embodiment

The embodiment of the present invention further provides a non-volatile computer storage medium storing one or more programs which when executed by an apparatus, cause the apparatus to perform the following operations:
receiving a first voice signal, which was input when a user sets a password, and forwarded by a client terminal;
extracting at least one random identifier from the first voice signal, wherein each of the random identifiers respectively corresponds to a keyboard element having a fixed identifier; and
determining the respective fixed identifiers of the keyboard elements corresponding to the various extracted random identifiers, and determining and storing the password set by the user according to the determined fixed identifiers.

When the storage medium causes the apparatus to perform the above-mentioned operations, preferably, the operations further include:
obtaining and storing the acoustic characteristic information of the user according to the first voice signal; or,
receiving a second voice signal input by the user and forwarded by the client terminal, and obtaining and storing the acoustic characteristic information of the user according to the second voice signal; and
the second voice signal is a voice signal corresponding to a content sent by the server in advance and in need to be pronounced by the user.

Further, the keyboard elements are:
matrix elements of a 3×3 matrix used for setting a gesture password; or
keyboard elements of a main keyboard in a main-subsidiary keyboard; or
keyboard elements displayed in the form of articles in an animated keyboard.

Further, the keyboard elements displayed in the form of articles are:
keyboard elements displayed in the form of fruits or keyboard elements displayed in the form of animals.

Further, the fixed identifiers of the keyboard elements are letters, numbers or pictures of articles, and the random identifiers of the keyboard elements are letters or numbers.

Eleventh Embodiment

The embodiment of the present invention further provides a non-volatile computer storage medium storing one or more programs which when executed by an apparatus, cause the apparatus to perform the following operations:
generating and displaying random identifiers of various keyboard elements having fixed identifiers, so as to enable a user to input a password by inputting a voice signal of the random identifier of at least one of the keyboard elements during the login; and
receiving a third voice signal input by the user during password verification, and transmitting the third voice signal to a server.

When the storage medium causes the apparatus to perform the above-mentioned operations, preferably, the operations further include:
receiving a fourth voice signal input by the user and transmitting the fourth voice signal to the server; and the fourth voice signal is a voice signal corresponding to a content sent by the server and in need to be pronounced by the user.

Further, the keyboard elements are:
matrix elements of a 3×3 matrix used for setting a gesture password; or
keyboard elements of a main keyboard in a main-subsidiary keyboard; or
keyboard elements displayed in the form of articles in an animated keyboard.

Further, the keyboard elements displayed in the form of articles are:
keyboard elements displayed in the form of fruits or keyboard elements displayed in the form of animals.

Further, the fixed identifiers of the keyboard elements are letters, numbers or pictures of articles, and the random identifiers of the keyboard elements are letters or numbers.

Twelfth Embodiment

The embodiment of the present invention further provides a non-volatile computer storage medium storing one or more programs which when executed by an apparatus, cause the apparatus to perform the following operations:
receiving a third voice signal, which was input by a user during password verification and forwareded by a client terminal;
extracting at least one random identifier from the third voice signal, wherein each of the random identifiers respectively corresponds to a keyboard element having a fixed identifier;
determining the respective fixed identifiers of the keyboard elements corresponding to the various extracted random identifiers, and determining the password input by the user according to the determined fixed identifiers; and
comparing the password input by the user with the password which was set by the user and pre-stored in the registration phase, obtaining a user identity authentication result according to the password comparison result, and returning the user identity authentication result to the client terminal.

When the storage medium causes the apparatus to perform the above-mentioned operations, preferably, the operations further include:
obtaining acoustic characteristic information of the user according to the third voice signal; or receiving, by the server, a fourth voice signal input by the user and forwarded by the client terminal, and obtaining the acoustic characteristic information of the user according to the fourth voice signal, wherein the fourth voice signal is a voice signal corresponding to a content sent by the server in advance and in need to be pronounced by the user;
comparing the obtained acoustic characteristic information with the acoustic characteristic information of the user stored in the registration phase in advance.

Obtaining the user identity authentication result according to the password comparison result includes:

obtaining the user identity authentication result according to the password comparison result and a comparison result of the acoustic characteristic information.

Further, the keyboard elements are:
matrix elements of a 3×3 matrix used for setting a gesture password; or
keyboard elements of a main keyboard in a main-subsidiary keyboard; or
keyboard elements displayed in the form of articles in an animated keyboard.

Further, the keyboard elements displayed in the form of articles are:
keyboard elements displayed in the form of fruits or keyboard elements displayed in the form of animals.

Further, the fixed identifiers of the keyboard elements are letters, numbers or pictures of articles, and the random identifiers of the keyboard elements are letters or numbers.

Thirteenth Embodiment

Figure 12:
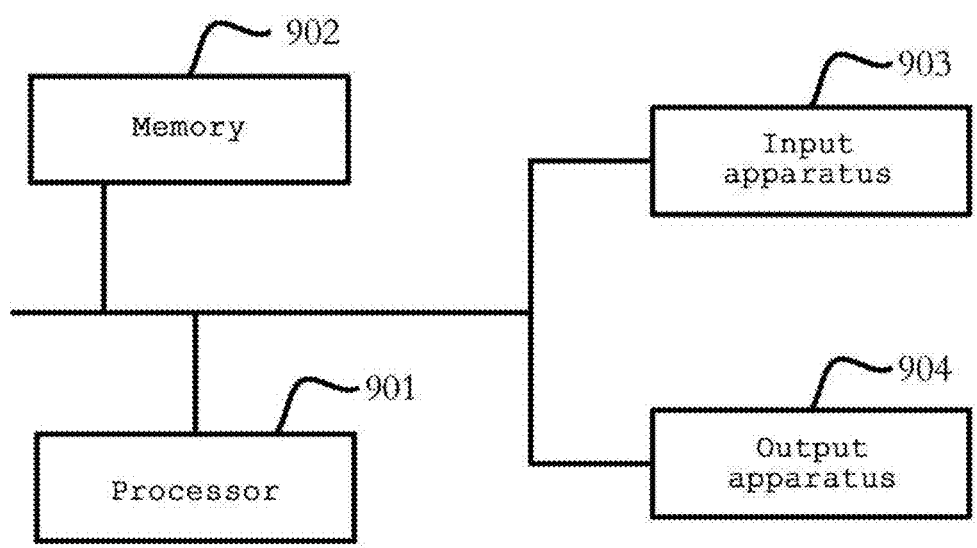
FIG. 12 is a schematic diagram of a hardware structure of a device provided by a thirteenth embodiment of the present invention.

FIG. 12 is a schematic diagram of a hardware structure of a device for executing a voiceprint verification method provided by a thirteenth embodiment of the present invention.

The device includes: one or more processors 901, and only one processor 901 is shown in FIG. 12 as an example; a memory 902; and one or more modules.

The device may further include: an input apparatus 903 and an output apparatus 904. The processor 901, the memory 902, the input apparatus 903 and the output apparatus 904 in the device may be connected by a bus or in other manners, and bus connection is taken as an example in FIG. 12.

As a computer-readable storage medium, the memory 902 may be used for storing software programs, computer executable programs and modules, such as the program instructions/modules (e.g., the random identifier generating module 510 and the first voice signal receiving and transmitting module 520 in the voiceprint verification apparatus as shown in FIG. 8) corresponding to the voiceprint verification method in the embodiments of the present invention. The processor 901 executes the software programs, instructions and modules stored in the memory 902 to perform various functional applications and data processing of the device, namely, to implement the voiceprint verification method in the embodiment of the present invention.

The memory 902 may include a program storage area and a data storage area, wherein an operating system and an application program required by at least one function may be stored in the program storage area; and data and the like created according to the use of the device may be stored in the data storage area. In addition, the memory 902 may include a high-speed random access memory, and may further include a non-volatile memory, for example, at least one disk storage device, a flash memory device or other non-volatile solid-state storage devices. In some examples, the memory 902 may further include memories which are deployed remotely relative to the processor 901, and these remote memories may be connected to a terminal device through a network. Examples of the above network include, but are not limited to, the Internet, an enterprise intranet, a local area network, a mobile communication network and the combinations thereof.

The input apparatus 903 may be used for receiving the input number or character information and generating a key signal input related to the user setting and function control of a terminal. The output apparatus 904 may include a display screen and other display devices.

The one or more modules are stored in the memory 902, and when executed by the one or more processors 901, perform the following operations:
generating and displaying random identifiers of various keyboard elements having fixed identifiers, so as to enable a user to set a password by inputting a voice signal of the random identifier of at least one of the keyboard elements; and
receiving a first voice signal input when the user sets the password, and transmitting the first voice signal to a server.

Further, preferably, the operations further include:
receiving a second voice signal input by the user and transmitting the second voice signal to the server; and the second voice signal is a voice signal corresponding to a content sent by the server and in need to be pronounced by the user.

Further, the keyboard elements are:
matrix elements of a 3×3 matrix used for setting a gesture password; or
keyboard elements of a main keyboard in a main-subsidiary keyboard; or
keyboard elements displayed in the form of articles in an animated keyboard.

Further, the keyboard elements displayed in the form of articles are:
keyboard elements displayed in the form of fruits or keyboard elements displayed in the form of animals.

Further, the fixed identifiers of the keyboard elements are letters, numbers or pictures of articles, and the random identifiers of the keyboard elements are letters or numbers.

Fourteenth Embodiment

Still referring to FIG. 12, the embodiment of the present invention further provides a device, which includes:
one or more processors 901, and only one processor 901 is shown in FIG. 12 as an example;
a memory 902; and one or more modules.

The device may further include: an input apparatus 903 and an output apparatus 904. The processor 901, the memory 902, the input apparatus 903 and the output apparatus 904 in the device may be connected by a bus or in other manners, and bus connection is taken as an example in FIG. 12.

As a computer-readable storage medium, the memory 902 may be used for storing software programs, computer executable programs and modules, such as the program instructions/modules (e.g., the first voice signal receiving module 610, the random identifier extracting module 620 and the password storing module 630 in the voiceprint verification apparatus as shown in FIG. 9) corresponding to the voiceprint verification method in the embodiments of the present invention. The processor 901 executes the software programs, instructions and modules stored in the memory 902 to perform various functional applications and data processing of the device, namely, to implement the voiceprint verification method in the embodiment of the present invention.

The memory 902 may include a program storage area and a data storage area, wherein an operating system and an application program required by at least one function may be stored in the program storage area; and data created according to the use of the device and the like may be stored in the data storage area. In addition, the memory 902 may include a high-speed random access memory, and may further include a non-volatile memory, for example, at least one disk storage device, a flash memory device or other non-volatile solid-state storage devices. In some examples, the memory 902 may further include memories which are deployed remotely relative to the processor 901, and these remote memories may be connected to a terminal device through a network. Examples of the above network include, but are not limited to, the Internet, an enterprise intranet, a local area network, a mobile communication network and the combinations thereof.

The input apparatus 903 may be used for receiving the input number or character information and generating a key signal input related to the user setting and function control of a terminal. The output apparatus 904 may include a display screen and other display devices.

The one or more modules are stored in the memory 902, and when being executed by the one or more processors 901, the one or more modules execute the following operations:
receiving a first voice signal, which was input when a user sets a password and forwarded by a client terminal;
extracting at least one random identifier from the first voice signal, wherein each of the random identifiers respectively corresponds to a keyboard element having a fixed identifier; and
determining the respective fixed identifiers of the keyboard elements corresponding to the various extracted random identifiers, and determining and storing the password set by the user according to the determined fixed identifiers.

Preferably, the operations further include:
obtaining and storing the acoustic characteristic information of the user according to the first voice signal; or,
receiving a second voice signal input by the user and forwarded by the client terminal, and obtaining and storing the acoustic characteristic information of the user according to the second voice signal; and
the second voice signal is a voice signal corresponding to a content sent by the server in advance and in need to be pronounced by the user.

Further, the keyboard elements are:
matrix elements of a 3×3 matrix used for setting a gesture password; or
keyboard elements of a main keyboard in a main-subsidiary keyboard; or
keyboard elements displayed in the form of articles in an animated keyboard.

Further, the keyboard elements displayed in the form of articles are:
keyboard elements displayed in the form of fruits or keyboard elements displayed in the form of animals.

Further, the fixed identifiers of the keyboard elements are letters, numbers or pictures of articles, and the random identifiers of the keyboard elements are letters or numbers.

Fifteenth Embodiment

Still referring to FIG. 12, the embodiment of the present invention further provides a device, which includes:
one or more processors 901, and only one processor 901 is shown in FIG. 12 as an example;
a memory 902; and one or more modules.

The device may further include: an input apparatus 903 and an output apparatus 904. The processor 901, the memory 902, the input apparatus 903 and the output apparatus 904 in the device may be connected by a bus or in other manners, and bus connection is taken as an example in FIG. 12.

As a computer-readable storage medium, the memory 902 may be used for storing software programs, computer executable programs and modules, such as the program instructions/modules (e.g., the random identifier generating module 710 and the third voice signal receiving and transmitting module 720 in the voiceprint verification apparatus as shown in FIG. 10) corresponding to the voiceprint verification method in the embodiments of the present invention. The processor 901 executes the software programs, instructions and modules stored in the memory 902 to perform various functional applications and data processing of the device, namely, to implement the voiceprint verification method in the embodiment of the present invention.

The memory 902 may include a program storage area and a data storage area, wherein an operating system and an application program required by at least one function may be stored in the program storage area; and data created according to the use of the device and the like may be stored in the data storage area. In addition, the memory 902 may include a high-speed random access memory, and may further include a non-volatile memory, for example, at least one disk storage device, a flash memory device or other non-volatile solid-state storage devices. In some examples, the memory 902 may further include memories which are deployed remotely relative to the processor 901, and these remote memories may be connected to a terminal device through a network. Examples of the above network include, but are not limited to, the Internet, an enterprise intranet, a local area network, a mobile communication network and the combinations thereof.

The input apparatus 903 may be used for receiving the input number or character information and generating a key signal input related to the user setting and function control of a terminal. The output apparatus 904 may include a display screen and other display devices.

The one or more modules are stored in the memory 902, and when executed by the one or more processors 901, perform the following operations:
generating and displaying random identifiers of various keyboard elements having fixed identifiers, so as to enable a user to input a password by inputting a voice signal of the random identifier of at least one of the keyboard elements during login; and
receiving a third voice signal input by the user during password verification, and transmitting the third voice signal to a server.

Preferably, the operations further include:
receiving a fourth voice signal input by the user and transmitting the fourth voice signal to the server; and the fourth voice signal is a voice signal corresponding to a content sent by the server and in need to be pronounced by the user.

Further, the keyboard elements are:
matrix elements of a 3×3 matrix used for setting a gesture password; or
keyboard elements of a main keyboard in a main-subsidiary keyboard; or
keyboard elements displayed in the form of articles in an animated keyboard.

Further, the keyboard elements displayed in the form of articles are:
keyboard elements displayed in the form of fruits or keyboard elements displayed in the form of animals.

Further, the fixed identifiers of the keyboard elements are letters, numbers or pictures of articles, and the random identifiers of the keyboard elements are letters or numbers.

Sixth Embodiment

Still referring to FIG. 12, the embodiment of the present invention further provides a device, which includes:
one or more processors 901, and only one processor 901 is shown in FIG. 12 as an example;

a memory 902; and one or more modules.

The device may further include: an input apparatus 903 and an output apparatus 904. The processor 901, the memory 902, the input apparatus 903 and the output apparatus 904 in the device may be connected by a bus or in other manners, and bus connection is taken as an example in FIG. 12.

As a computer-readable storage medium, the memory 902 may be used for storing software programs, computer executable programs and modules, such as the program instructions/modules (e.g., the third voice signal receiving module 810, the random identifier extracting module 820, the password storing module 830 and the user identity authentication module 840 in the voiceprint verification apparatus as shown in FIG. 11) corresponding to the voiceprint verification method in the embodiments of the present invention. The processor 901 executes the software programs, instructions and modules stored in the memory 902 to perform various functional applications and data processing of the device, namely, to implement the voiceprint verification method in the embodiment of the present invention.

The memory 902 may include a program storage area and a data storage area, wherein an operating system and an application program required by at least one function may be stored in the program storage area; and data created according to the use of the device and the like may be stored in the data storage area. In addition, the memory 902 may include a high-speed random access memory, and may further include a non-volatile memory, for example, at least one disk storage device, a flash memory device or other non-volatile solid-state storage devices. In some examples, the memory 902 may further include memories which are deployed remotely relative to the processor 901, and these remote memories may be connected to a terminal device through a network. Examples of the above network include, but are not limited to, the Internet, an enterprise intranet, a local area network, a mobile communication network and the combinations thereof.

The input apparatus 903 may be used for receiving the input number or character information and generating a key signal input related to the user setting and function control of a terminal. The output apparatus 904 may include a display screen and other display devices.

The one or more modules are stored in the memory 902, and when executed by the one or more processors 901, perform the following operations:
receiving a third voice signal, which was input by a user during password verification and forwarded by a client terminal;
extracting at least one random identifier from the third voice signal, wherein each of the random identifiers respectively corresponds to a keyboard element having a fixed identifier;
determining the respective fixed identifiers of the keyboard elements corresponding to the various extracted random identifiers, and determining a password input by the user according to the determined fixed identifiers; and
comparing the password input by the user with the password which was set by the user and pre-stored in the registration phase, obtaining a user identity authentication result according to the password comparison result, and returning the user identity authentication result to the client terminal.

Preferably, the operations further include:
obtaining acoustic characteristic information of the user according to the third voice signal; or receiving, by the server, a fourth voice signal input by the user and forwarded by the client terminal, and obtaining the acoustic characteristic information of the user according to the fourth voice signal, wherein the fourth voice signal is a voice signal corresponding to a content sent by the server in advance and in need to be pronounced by the user;
comparing the obtained acoustic characteristic information with the acoustic characteristic information of the user stored in the registration phase in advance.

Obtaining the user identity authentication result according to the password comparison result includes:
obtaining the user identity authentication result according to the password comparison result and a comparison result of the acoustic characteristic information.

Further, the keyboard elements are:
matrix elements of a 3×3 matrix used for setting a gesture password; or
keyboard elements of a main keyboard in a main-subsidiary keyboard; or
keyboard elements displayed in the form of articles in an animated keyboard.

Further, the keyboard elements displayed in the form of articles are:
keyboard elements displayed in the form of fruits or keyboard elements displayed in the form of animals.

Further, the fixed identifiers of the keyboard elements are letters, numbers or pictures of articles, and the random identifiers of the keyboard elements are letters or numbers.

According to the foregoing description of the embodiments, it should be clear to those skilled in the art that the present invention may be implemented by means of software and necessary general hardware, and certainly may be implemented by hardware. In most cases, the former implementation is preferred. Based on such an understanding, the technical solutions in the present invention essentially, or the part contributing to the prior art may be implemented in the form of a software product. The computer software product may be stored in a computer readable storage medium, such as a floppy disk, a Read-Only Memory (ROM), a Random Access Memory (RAM), a flash, a magnetic disk, or an optical disk of a computer, and includes several instructions which causes a computer device (which may be a personal computer, a server, a network device, etc.) to perform the method described in the embodiments of the present invention.

It should be noted that, in the above-mentioned embodiments of the voiceprint verification apparatus, the systems are divided based on functional logic only, but the present invention is not limited to the above division as long as corresponding functions can be implemented. In addition, the specific names of the functional units are used only for distinguishing one from another, but do not intend to limit the scope of protection of the present invention.

Described above are merely exemplary embodiments of the present invention, but the protection scope of the present invention is not limited thereto. Any variations or substitutions readily conceivable to those skilled in the art within the disclosed technical scope of the present invention shall fall into the protection scope of the present invention. Accordingly, the protection scope of the present invention is defined by the protection scope of the claims.

What is claimed is:
1. A voiceprint verification method, comprising:
displaying, by a client terminal, a plurality of keyboard elements in which each keyboard element corresponds to a fixed identifier within an interface, wherein the plurality of keyboard elements comprise at least one of:
matrix elements of a 3×3 matrix configured to set a gesture password;

keyboard elements of a main keyboard in a main-subsidiary keyboard; or keyboard elements displayed in a form of articles in an animated keyboard;

generating and displaying, by the client terminal, random identifiers within the interface, wherein the random identifiers are generated by randomizing the plurality of keyboard elements, so as to enable a user to set a password made up of fixed identifiers by inputting a first voice signal of the random identifiers of at least one of the keyboard elements;

receiving, by the client terminal, the first voice signal inputted when the user sets the password, and transmitting the first voice signal to a server, wherein the first voice signal is recognized by the server as comprising the random identifiers and the server determines the password based upon identifying the fixed identifiers corresponding to the recognized random identifiers;

displaying on the client terminal, content received from the server to be pronounced by the user, wherein the content comprises a random number string; and receiving, by the client terminal, a second voice signal inputted by the user and transmitting the second voice signal to the server, wherein the second voice signal is recognized as valid based upon server determining the second voice signal contains the content sent by the server.

2. The voiceprint verification method of claim 1, wherein the keyboard elements displayed in the form of articles comprise: keyboard elements displayed in the form of fruits or keyboard elements displayed in the form of animals.

3. The voiceprint verification method of claim 1, wherein the fixed identifiers of the plurality of keyboard elements comprise letters, numbers or pictures of articles, and the random identifiers of the keyboard elements comprise letters or numbers.

4. A voiceprint verification method, comprising:

displaying, by a client terminal, a plurality of keyboard elements in which each keyboard element corresponds to a fixed identifier within an interface, wherein the plurality of keyboard elements comprise at least one of:

matrix elements of a 3×3 matrix configured to set a gesture password;

keyboard elements of a main keyboard in a main-subsidiary keyboard; or keyboard elements displayed in a form of articles in an animated keyboard;

generating and displaying, by the client terminal, random identifiers within the interface, wherein the random identifiers are generated by randomizing the plurality of keyboard elements, which enables a user to set a password made up of fixed identifiers by inputting a first voice signal of the random identifiers of at least one of the keyboard elements during login;

receiving, by the client terminal, the first voice signal inputted by the user during password verification of the login and transmitting the first voice signal to a server, wherein the server determines the password by recognizing the first voice signal as comprising the random identifiers and the fixed identifier which corresponds to the recognized random identifier being used for the password verification;

displaying on the client terminal, content received from the server to be pronounced by the user, wherein the content comprises a random number string; and receiving, by the client terminal, a second voice signal inputted by the user and transmitting the second voice signal to the server, wherein the second voice signal is recognized as valid based upon the server determining the second voice signal contains the content sent by the server.

5. The voiceprint verification method of claim 4, wherein the keyboard elements displayed in the form of articles comprise:

keyboard elements displayed in the form of fruits or keyboard elements displayed in the form of animals.

6. The voiceprint verification method of claim 4, wherein the fixed identifiers of the keyboard elements comprise letters, numbers or pictures of articles, and the random identifiers of the keyboard elements comprise letters or numbers.

* * * * *